Feb. 16, 1954
R. M. SHERMAN
2,669,443
APPARATUS FOR GENERATING AND DELIVERING
HOT GASEOUS PRODUCTS
Filed July 13, 1950
3 Sheets-Sheet 1
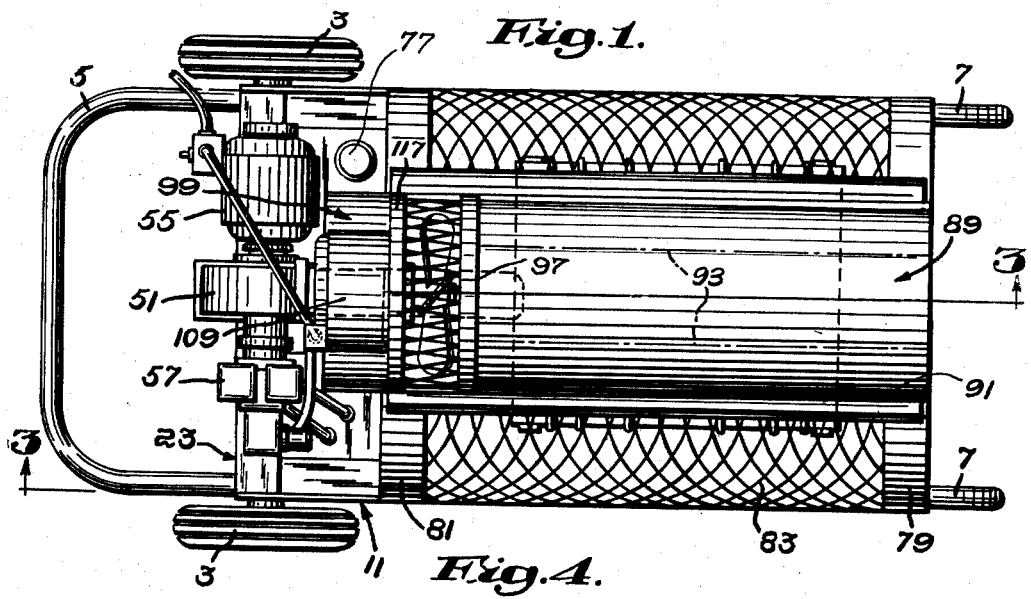
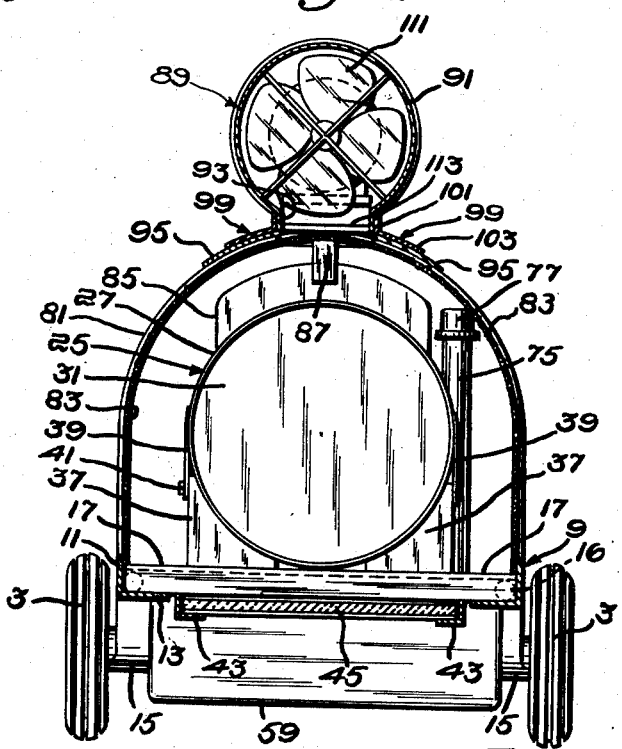
Inventor:
Ralston M. Sherman,
by Emery Booth Townsend
Miller + Weidner Attys Feb. 16, 1954
R. M. SHERMAN
2,669,443
APPARATUS FOR GENERATING AND DELIVERING
HOT GASEOUS PRODUCTS
Filed July 13, 1950
3 Sheets-Sheet 2
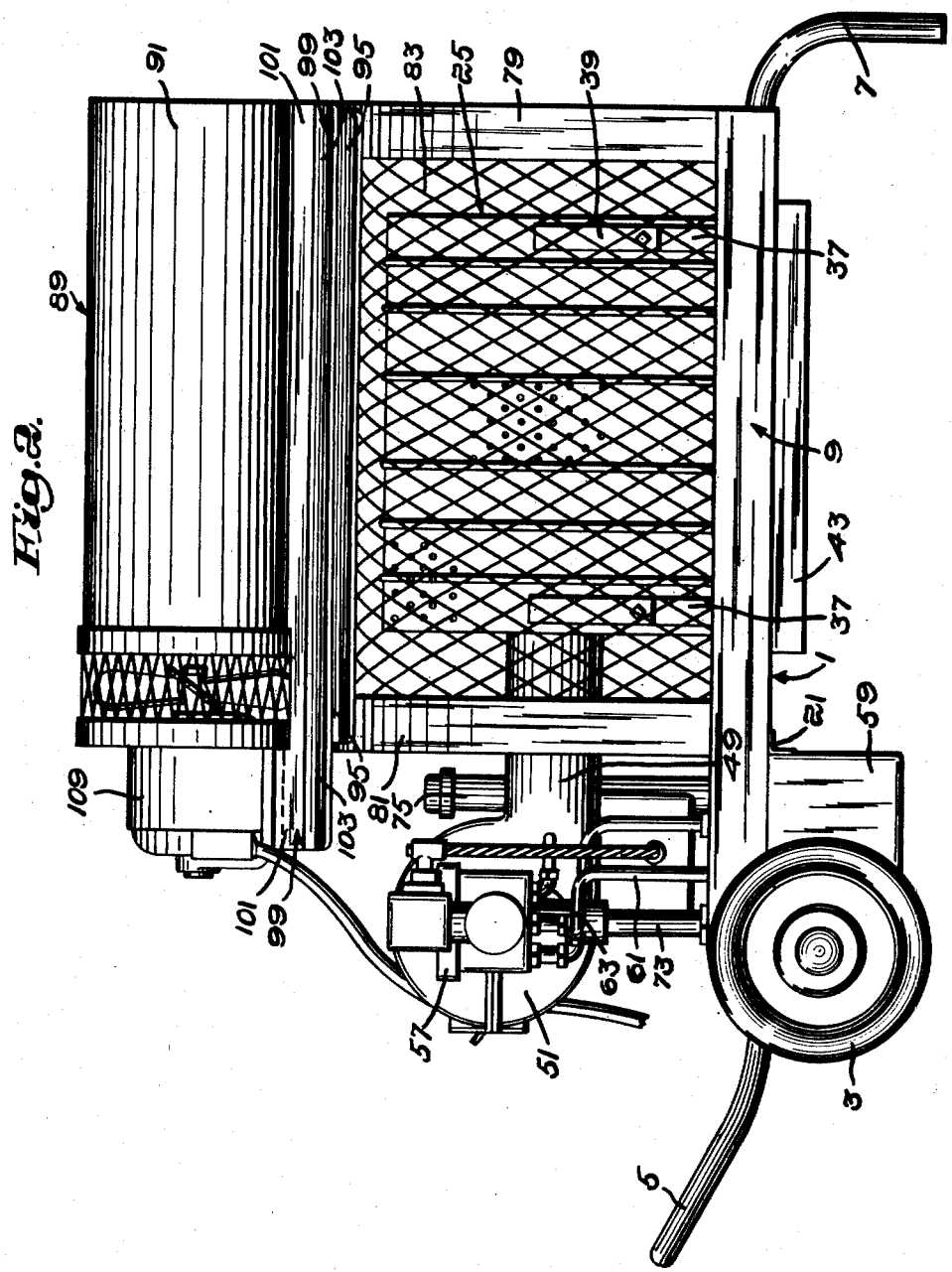
Inventor:
Ralston M. Sherman,
by Emery Booth Townsend
Miller & Neidner Attys

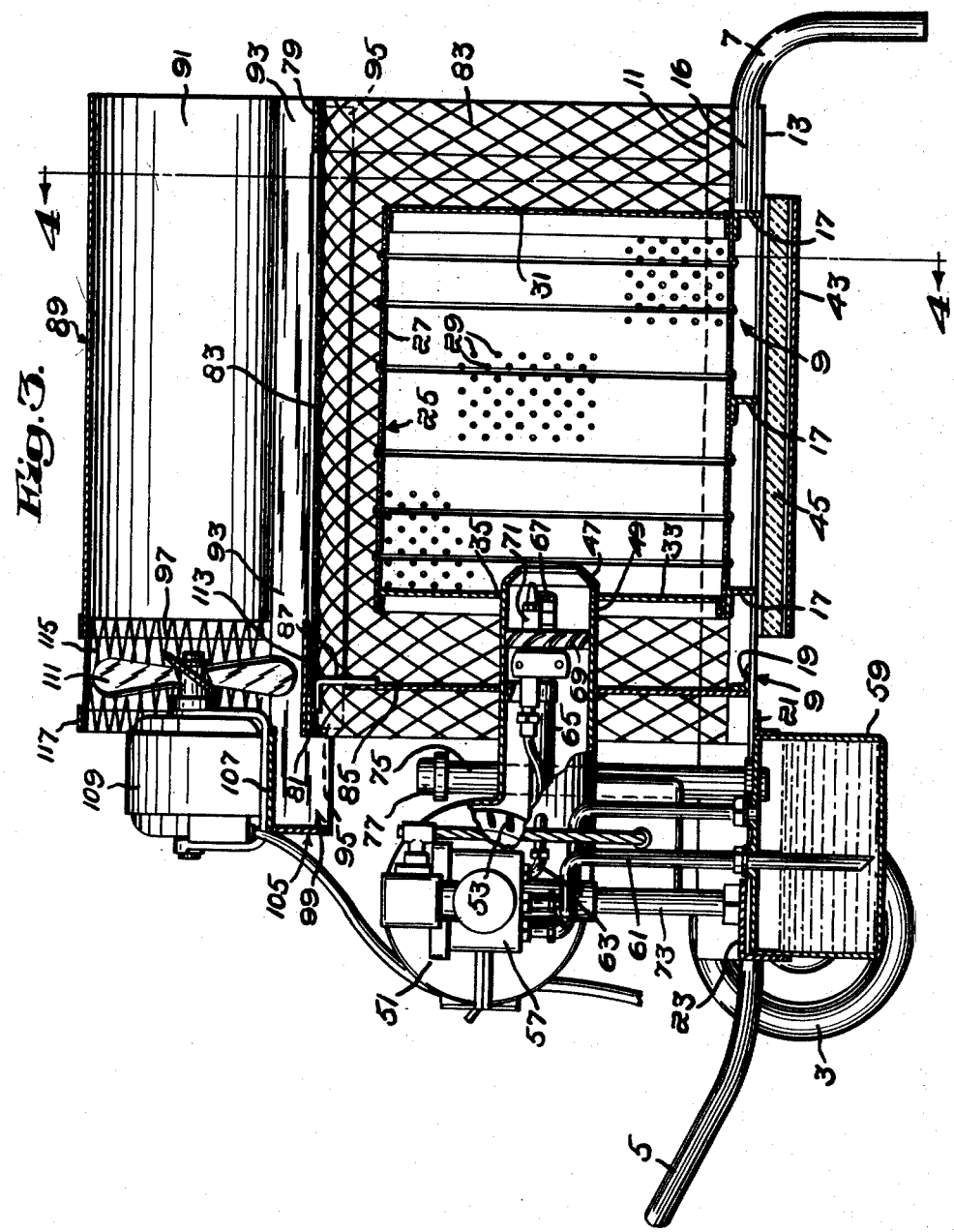

Patented Feb. 16, 1954

2,669,443

UNITED STATES PATENT OFFICE 2,669,443

APPARATUS FOR GENERATING AND DELIVERING HOT GASEOUS PRODUCTS

Rallston M. Sherman, Glastonbury, Conn., assignor to The Silent Glow Oil Burner Corporation, Hartford, Conn., a corporation of Connecticut Application July 13, 1950, Serial No. 173,574

2 Claims. (Cl. 263—19)

My invention relates to apparatus for generating and delivering hot gaseous products and radiant heat to a space to be heated.

The invention has among its objects the provision for directing an unconfined blast of atmospheric air in superimposed contacting relation to a hot gaseous medium traveling with it so that the two will not mix until they are projected a considerable distance away from the apparatus producing the composite blast thus formed, and provision for heating by radiant heat the confining walls of a space in which said apparatus is placed.

The invention and its other objects however will be best understood from the following description when read in the light of the accompanying drawings of an embodiment of the invention selected for illustrative purposes, while the scope of the invention will be more particularly pointed out in the appended claims.

In the drawings—

Fig. 1 is a plan of apparatus according to the invention;

Fig. 2 is a side elevation of the apparatus according to Fig. 1;

Fig. 3 is a section on the line 3—3 of Fig. 1, with parts in elevation and parts broken away; and Fig. 4 is a section on the line 4—4 of Fig. 3, with parts in elevation.

The embodiment of the invention illustrated comprises a truck-like supporting part comprising a chassis 1 having at one end a pair of spaced wheels 3 adapted to rest on the floor or ground, and a U-shaped bumper 5, and at its opposite end a pair of spaced legs 7 the lower ends of which are adapted to rest on the floor or ground for supporting the chassis in horizontal position, these legs also serving as handles for lifting the end of the chassis from which they extend for manually moving the apparatus about by use of the wheels 3.

As illustrated, the chassis 1 comprises the spaced elongated angle-irons 9 defining the opposite longitudinal sides of the chassis, these angle-irons having the upstanding vertical flanges 11 and horizontal flanges 13. The angle-irons 9 are shown as extending for the full length of the chassis and are held in spaced relation by the spaced transversely disposed angle-irons 17, 19, 21 and 23 the ends of which are welded to the angle-irons 9. The bearing 15 for the separate axles (not shown) of the wheels 3 are welded to the under sides of the flanges 13 of the angle-irons 9, while the legs 7 have the horizontal portions 16 welded to the upper sides of the flanges 13 and adjacent sides of the flanges 11. The bumper 5, as shown, has its ends welded to the angle-iron 23.

As shown, the chassis carries a combustion chamber in the form of a sheet metal drum 25 having cylindrical walls 27 provided with the small relatively closely spaced perforations 29 which are distributed over the entire cylindrical surface. As illustrated, the drum is closed by end walls 31 and 33 which are entirely imperforate except that the end wall 33 is provided with a central opening 35. As further illustrated, the drum at opposite ends is carried by the blocks 37, of heat refractory material, supported on and secured to the adjacent angle-irons 17. For securing the drum to the blocks, strips 39, welded at their upper end portions to the drum and bolted to the blocks at 41 (Fig. 4), are provided. As shown, welded to the under sides of the angle-irons 17 are longitudinally extending angle-irons 43 which may carry a sheet 45 of heat refractory material for preventing the hot walls of the combustion chamber from scorching the floor on which the apparatus is supported. In many cases this sheet 45 may consist merely of a relatively thin sheet of stainless steel, particularly when the apparatus is employed for defrosting and heating the floor and other walls of a railroad refrigerator car as hereinafter described.

The combustion apparatus comprising the drum or combustion chamber 25 may be identical with that described in applicant's pending application Serial Number 115,090, filed September 10, 1949, and therefore need not be described with any more particularity than necessary to explain the present invention. As shown, the opening 35 of the end wall 33 of the drum receives the discharge end portion 47 (Fig. 3) of an air conduit 49, which latter at its opposite end communicates with a casing 51 of a fan 53 driven by an electric motor 55 (Fig. 1). This fan forces atmospheric air through the air conduit 49 into the combustion chamber 25, the amount of air discharged by the fan being regulated in the usual manner by adjustable shutters (not shown) positioned on one end of the casing, which shutters control the size of the air intake to the fan. As in the conventional gun type oil burner, a pump 57 driven by the same motor as the fan draws fuel oil from a tank 59 through a pipe 61 in communication with the intake of the pump. Such oil the pump discharges under pressure into a pipe 63 in communication with an oil conduit or pipe 65 positioned axially of the air conduit 49, the pipe 65 having at its end adjacent the combustion chamber a spray nozzle 67 for atomizing or comminuting the fuel oil. The fuel oil so atomized enters the combustion chamber 25 admixed with the air discharging from the adjacent end of the air conduit 49. The nozzle is so designed as to secure the desired pattern of the flame produced by the mixture when it is burned in the combustion chamber and to secure the desired amount of oil supplied the combustion chamber. Preferably, positioned in the air conduit 49 adjacent the combustion chamber is a circumferential series of vanes 69 for causing a whirling action of the air discharged into the combustion chamber so as thoroughly to mix such air with the atomized oil. The burner, as shown, is provided with an ignition spark device 71 for igniting the mixture, and preferably is provided with the usual controls for governing the operation of the burner.

As illustrated, the motor 55, fan casing 51 and pump 57 are supported by standards 73 carried by the angle-iron 23. The oil tank 59, as shown, is supported at one side by the angle-iron 23 and at its opposite side by the angle-iron 21, to which angle-irons it is preferably welded. For supplying fuel oil to the tank it is provided with a filling pipe 75 having the removable cap 77.

As described in applicant's above mentioned pending application, complete combustion of the oil may be secured by, among other things, having in the combustion chamber a flame of such pattern that it does not contact with the walls of said chamber, the oil being supplied the chamber at such rate that the perforated area of the chamber throughout its extent is heated to incandescence, say from 900 to 1500° F. Such complete combustion will result in the gaseous products of combustion discharged through the perforations 29 containing no inflammable products, and will render such products odorless and smokeless, for with complete combustion the gaseous combustion products escaping through the perforations 29 will consist wholly of carbon dioxide, nitrogen, excess oxygen, and water vapor.

As further pointed out in the above mentioned pending application, to secure complete combustion the perforations 29 should not exceed approximately 0.15 inch in diameter or otherwise have a cross-sectional area greater than that approximately represented by a circular perforation of such diameter, the perforations preferably being as small as can be economically produced, said about 0.08 inch in diameter. Furthermore, to secure complete combustion, the total area presented by the perforations per square inch of perforated surface should be from approximately 0.05 to 0.14 square inch, while the sheet metal constituting the perforated portion of the combustion chamber should be as thin as structural requirements will permit, refractory sheet metal, such as stainless steel, about $\frac{1}{32}$ inch thick giving satisfactory results in most situations. Furthermore, as pointed out in said application, to secure complete combustion the cubical contents of the combustion chamber should be from approximately 2300 to 4000 cubic inches per gallon of oil burned therein per hour, with the total perforated surface of the chamber expressed in square inches from 15 to 35% of the arithmetical value of the cubical contents of the chamber expressed in cubic inches.

Various kinds of fuel oils may be burned, satisfactory results having been secured with ordinary commercial gasoline, kerosene, and all grades of fuel oil up to so-called No. 3 fuel oil.

When a cylindrical combustion chamber is employed, as shown in the drawings, the relation between its diameter and its length is not critical, satisfactory results having been secured where the length of the chamber is from 1 to 4 times its diameter. Examples of these cylindrical combustion chambers are those 15 inches in diameter and 18 inches long, 22 inches in diameter and 24 inches long, 22 inches in diameter and 36 inches long, and 26 inches in diameter and 30 inches long. Other proportions between the length and diameter of the combustion chamber however may be employed, and satisfactory results have been secured with combustion chambers the lengths of which are less than their diameters, for example, combustion chambers 22 inches in diameter and 18 inches long.

As shown, positioned beyond one end of the combustion chamber 25 is an inverted U- or arch-shaped bar 79 and positioned beyond its opposite end a like inverted U- or arch-shaped bar 81, the opposite ends of these bars being welded to the upper edges of the adjacent flanges 11 of the angle-irons 9. At the inner sides of the arches formed by these bars are welded the end portions of an inverted U- or arch-shaped screen 83 which laterally encloses the drum for reducing fire hazards and preventing injury to the operator. Preferably between the end wall 33 of the drum and the motor 55 and parts driven by that motor is positioned a heat shield 85 secured at its upper end to the adjacent arch-shaped bar 81 by a bracket 87 and at its lower end to the upstanding flange of the angle-iron 19.

Above the drum exteriorly of the screen is shown a sheet metal conduit member 89, formed to provide in cross-section an arcuate portion 91, and, at the lower edges of the latter, to provide the spaced vertical flanges 93 terminating at their lower edges in wide laterally projecting arcuate flanges 95, which latter flanges at opposite longitudinal ends are welded to the outer sides of the adjacent portions of the arch-shaped bars 79 and 81. This conduit member 89 may be formed, for example, as an integral piece by bending a suitably shaped sheet of metal, or the portion 91 may be formed separately and welded or otherwise secured to sheet metal strips bent to form elongated members each consisting of one of the flanges 93 and adjacent flanges 95. It will be observed that the space between the two flanges 93 forms a slot placing the interior of the portion 91 of the conduit member in communication with the space above the combustion chamber 25 by way of the interstices of the upper portion of the screen 83.

As shown, the left hand end of the portion 91 of the conduit member 89, as viewed in Fig. 3, terminates in a vertical plane, indicated by the line 97, at the right of the bar 81, the vertical flanges 93 and arcuate flanges 95 of the conduit member however continuing past said plane to said bar. For stiffening the flanges 93 and 95 are provided the longitudinally extending members 99 having the vertical flanges 101 lying against and welded to the flanges 93 and having the arcuate flanges 103 lying against and welded to the arcuate flanges 95. The members 99, as shown, extend to the left of the bar 81, as viewed in Figs. 1 and 2, to form projecting portions to which is welded an angle-shaped bracket 105 positioned between said portions, the upper horizontal flange 107 of which bracket supports an electric motor 109 which carries and drives a blower in the form of a fan 111. As shown, extending across the space between the flanges 101 below the fan is a plate 113 which serves to prevent the fan from drawing upward products of combustion discharged from the combustion chamber and forcing them mixed with the air of the blast produced by the fan into the portion 91 of the conduit member 89. As shown, surrounding the fan is a protective screen 115 welded at one edge to the adjacent portion of the conduit member 89 and at its opposite edge to an arcuate bar 117, the lower edges of which latter are welded to the upper edges of the vertical flanges 101 of the members 99.

In operation the fan 111 will project through the portion 91 of the conduit member 89 a blast of atmospheric air. This blast, being projected horizontally lengthwise of the slot-like opening formed by the space between the flanges 93, will by ejector action draw into the portion 91 of the conduit member the hot products of combustion discharged through the perforations 29 of the combustion chamber 25, the wide arcuate flanges 95 of the conduit member serving as baffles to trap and to guide such products to said slot. Such drawing of the combustion products through the slot in turn induces a flow of atmospheric air through the interstices of those portions of the screen 33 which lie beyond the outer edges of the flanges 95, such air flowing over the hot walls of the combustion chamber to mix with the hot products of combustion escaping from the combustion chamber through the perforations 29 thereof, so as to form a hot gaseous medium which is drawn into the portion 91 of the conduit member by way of the slot, the flowing of the air over the hot walls of the combustion chamber also heating said air to augment the heat of the gaseous medium. The friction of the blast of atmospheric air projected by the fan on the hot gaseous medium in the slot-like opening draws such gaseous medium into the conduit portion 91. By causing the atmospheric air to travel through the conduit at high speed with relation to the length of the conduit, and thus reduce to a minimum the time it is within the conduit, mixture within the conduit of the hot gaseous medium with such air will be reduced to a minimum, so that with such high speed of travel there will tend to be discharged from the conduit a blast of relatively cooler atmospheric air in superimposed relation to a blast of hot gaseous medium, the composite blast thus formed traveling a considerable distance from the discharge end of the conduit before the hot gaseous medium has time to rise through the cooler portions of the blast to permit complete mixture of the hotter and cooler portions of the composite blast. At slower speeds of the atmospheric air projected through the conduit by the fan, resulting in such air being within the conduit a longer time, more or less mixture with such air of the hot gaseous medium drawn into the conduit may occur, but under such conditions the resulting blast projected from the conduit is still useful for drying, defrosting and heating purposes, which would be true even if substantially complete mixture could conceivably occur within the conduit. However, in the apparatus shown by the accompanying drawings complete mixing cannot occur within the conduit because of the short time there are within the conduit the fractions of hot gaseous mixture which enter the conduit through those portions of the slot-like opening which are positioned toward the discharge end of the conduit.

The length and diameter of the conduit formed by the portion 91 of the conduit member 89, and the width of the longitudinal slot in the bottom wall of such conduit defined by the space between the flanges 93, are not critical. As an example, the conduit may be about 10 inches in diameter and 24 inches long, the open portion of the slot to the right of the plate 113, as viewed in Fig. 3, being of this same length and about 6½ inches wide. Neither is the distance between the top of the combustion chamber and the bottom of the slot just mentioned critical. As an example, this distance may be about 4 inches. With these examples of conduit, slot and distance just given the drum, for example, may be 15 inches in diameter and 18 inches long.

The distance the composite blast is projected after it leaves the conduit formed by the portion 91 of the conduit member 89 will vary with the amount of atmospheric air forced through that conduit by the fan. In the specific example above described this composite blast will, for example, be projected about 20 to 25 feet when the fan forces about 1200 cubic feet of free atmospheric air per minute through the conduit. The amount of combustion products of course will depend upon the amount of fuel oil burned, which amount to secure complete combustion should be within the limits hereinbefore defined. In the specific example mentioned ordinarily the requisite temperature and amount of gaseous medium for most purposes will be secured when about 1.2 gallons of fuel oil are burned per hour and are admixed with about 300 cubic feet of free air per minute to form the combustible mixture entered into the combustion chamber.

The apparatus according to the invention is applicable to many uses. Its use for defrosting and preheating railroad refrigerator cars well illustrates its wide range of applicability to other uses. Refrigerator cars loaded with vegetables come up from the south to points in the north with the ice bunkers at the ends of the cars more or less filled with ice for keeping the interiors of the cars cool. When the cars are unloaded they are commonly sent to points in cold climates, such as Aroostook County in Maine and points in Idaho and northern Minnesota, and to like places subject to zero and sub-zero temperatures, to be loaded with potatoes, apples and other perishables which do not stand freezing. At these cold places the remaining ice in the ice bunkers is usually in the form of a more or less solid mass which must be melted out of the bunkers, while the interiors of the cars must be defrosted and their floors, side walls and ceilings moderately preheated, before the cars can be safely reloaded with perishables at these cold places. In employing the apparatus according to the invention for these purposes, that apparatus may be wheeled into the car and placed in it toward one of its ends a slight distance from the partially open side doors at the middle of the length of the car and in position to direct the composite or other blast produced by the apparatus toward the ice bunker at that end of the car. When the apparatus is placed in operation the blast strikes the bunker and melts the ice in it to form water which escapes through the drain at the bottom of the bunker to outside the car, while the radiant heat emitted sideways and downward from the incandescent walls of the combustion chamber defrosts and preheats the side walls and floor of the car, the sheet 45 beneath the combustion chamber so reducing the radiant heat to which the floor is subjected as to prevent scorching of the floor. The hot and cold layers of the composite blast mix when they strike the bunker and rise and flow toward the center of the length of the car to defrost and preheat the ceiling. The improved apparatus, however, avoids the defect, of prior heaters attempted to be used for this purpose, of blistering or scorching the ceiling of the car, because in the improved apparatus the amount of radiant heat directed upward from the combustion chamber toward the ceiling of the car is much reduced by the shielding effect of the flanges 95 and conduit 89, which latter is kept cool by the blast of relatively cooler air projected through it, the temperature of the top of this conduit seldom exceeding 100° F. After the ice in the bunker is melted out the apparatus may be turned around and moved to the opposite side of the car side doors and the operation repeated for melting the ice out of the bunker at the other end of the car and for defrosting and preheating the floor, side walls and ceiling at the other half of the car. As a result of all this, the bunkers may be effectively and quickly cleared of ice, and the floor, side walls and ceiling of the car effectively and quickly defrosted and preheated without damage to the car itself.

The combination of lateral radiant heat emission and projection of a composite or other blast has application also to drying the plaster of new buildings. For such use it is necessary, while the plaster on the side walls is being dried, to keep the heat applied to the ceilings at a temperature low enough to prevent the plaster on the ceilings from drying too quickly lest it crack, it being observed that the apparatus when positioned on the center portion of the floor of a room ordinarily will be much closer to the ceiling than to the side walls of the room.

It will be understood that within the scope of the appended claims wide deviations may be made from the form of the invention described without departing from the spirit of the invention.

I claim:

1. Apparatus for both radiating heat and producing a blast of hot gaseous heating medium, said apparatus having oil burning means comprising a combustion chamber and means for entering into said chamber a mixture of atomized fuel oil and combustion supporting air and causing such oil to burn in said chamber with a flame in out-of-contacting relation with the surrounding walls of said chamber; which surrounding walls are constituted by opposite end walls and, connecting said end walls, a horizontally extending substantially cylindrical lateral wall of thin heat refractory material exposed to the surrounding atmosphere and adapted to be heated to incandescence by said flame for radiating heat outwardly thereof and for heating the surrounding air in contact with its exterior; said lateral wall being formed with a multitude of small perforations for discharge of combustion products from said chamber for admixture with such heated air at the exterior of said wall to form a hot gaseous mixture; a horizontal conduit, of at least approximately the horizontal length of said combustion chamber, positioned above said lateral wall in vertical spaced relation thereto and extending longitudinally thereof, which conduit has an open discharge end and is formed operatively to provide on its under side a slot-like opening extending longitudinally thereof for at least approximately the horizontal length of said lateral wall for receiving said hot gaseous mixture; a fan or the like for blowing a blast of atmospheric air through said conduit longitudinally thereof over said longitudinally extending slot-like opening toward the open discharge end of said conduit for discharge therefrom through said open end for causing said blast to draw, by ejector action, said hot gaseous mixture through said slot-like opening into said conduit and concomitantly causing ascent of such mixture as the latter is formed at the exterior of said lateral wall; and baffles extending from adjacent the opposite edges, respectively, of said slot-like opening outwardly from said edges over said lateral wall of said combustion chamber in superimposed spaced relation to the upper portion of said wall for trapping and directing the ascending hot gaseous mixture into said slot-like opening and, in conjunction with said conduit, shielding the space above said conduit from upwardly directed heat radiated from said wall.

2. Apparatus for both radiating heat and producing a blast of gaseous heating medium comprising means forming a combustion chamber the surrounding walls of which are constituted by opposite end walls and a horizontally extending substantially cylindrical lateral wall of sheet metal exposed to the surrounding atmosphere, which lateral wall is formed with a multitude of small perforations constituting substantially the sole means for discharge of combustion products from said chamber; burner means for entering into said chamber, through one of its end walls a blast directed toward its opposite end wall consisting of atomized fuel oil mixed with requisite air for supporting its complete combustion, which burner means constitutes substantially the sole means of entering air into said chamber and comprises a nozzle for atomizing said oil and discharging it into said chamber in the form of a spray of such pattern as will produce a flame in said chamber in out-of-contacting relation with the walls of said chamber for heating at least said lateral wall to incandescence for radiating heat outwardly thereof and for heating the surrounding air in contact with its exterior, with which heated air the products of combustion discharged through said perforations of said lateral wall are adapted to mix to form a hot gaseous mixture; a horizontal conduit, of at least approximately the horizontal length of said combustion chamber, positioned above said lateral wall in vertical spaced relation thereto and extending longitudinally thereof, which conduit has an open discharge end and is formed operatively to provide on its under side a slot-like opening extending longitudinally thereof for at least approximately the horizontal length of said lateral wall for receiving said hot gaseous mixture; a fan or the like for blowing a blast of atmospheric air through said conduit longitudinally thereof over said longitudinally extending slot-like opening toward the open discharge end of said conduit for discharge therefrom through said open end for causing said blast to draw, by ejector action, said hot gaseous mixture through said slot-like opening into said conduit and concomitantly causing ascent of said mixture as the latter is formed at the exterior of said lateral wall; and baffles extending from adjacent the opposite edges, respectively, of said slot-like opening outwardly from said edges over said lateral wall of said combustion chamber in superimposed spaced relation to the upper portion of said wall for trapping and directing the ascending hot gaseous mixture into said slot-like opening and, in conjunction with said conduit, shielding the space above said conduit from upwardly directed heat radiated from said wall.

RALLSTON M. SHERMAN.

References Cited in the file of this patent

UNITED STATES PATENTS

| Number | Name | Date |
|---|---|---|
| 575,974 | Nesmith | Jan. 26, 1897 |
| 744,044 | Burnham | Nov. 17, 1903 |
| 900,434 | Siegfried | Oct. 6, 1908 |
| 2,195,957 | Joyce | Apr. 2, 1940 |
| 2,579,158 | Scheu | Dec. 18, 1951 |